US012793350B2

(12) United States Patent
Kopp et al.

(10) Patent No.: US 12,793,350 B2
(45) Date of Patent: Nov. 10, 2026

(54) METHOD AND SYSTEM FOR DETERMINING A LOCATION OF A VIRTUAL CAMERA IN INDUSTRIAL SIMULATION

(71) Applicant: Siemens Industry Software Ltd., Tel Aviv (IL)

(72) Inventors: Hans Kopp, Ismaning (DE); Shahar Feldman, Mishmar David (IL); Gil Chen, Bnei Zion (IL); Swaroop Kulkarni, Pune (IN); Ravi Ranjan, Pune (IN)

(73) Assignee: Siemens Industry Software Ltd., Tel Aviv (IL)

( * ) Notice: Subject to any disclaimer, the term of this patent is extended or adjusted under 35 U.S.C. 154(b) by 202 days.

(21) Appl. No.: 18/705,040

(22) PCT Filed: Oct. 26, 2021

(86) PCT No.: PCT/IB2021/059853

§ 371 (c)(1),
(2) Date: Apr. 26, 2024

(87) PCT Pub. No.: WO2023/073398

PCT Pub. Date: May 4, 2023

(65) Prior Publication Data

US 2024/0420425 A1 Dec. 19, 2024

(51) Int. Cl.
*G06F 30/20* (2020.01)
*G06T 15/20* (2011.01)
*G06T 19/00* (2011.01)

(52) U.S. Cl.
CPC ............ *G06T 19/003* (2013.01); *G06T 15/20* (2013.01)

(58) Field of Classification Search
CPC ........ G06T 19/003; G06T 15/20; G06F 30/20
See application file for complete search history.

(56) References Cited

U.S. PATENT DOCUMENTS

| | | | | |
|---|---|---|---|---|
| 10,872,463 | B2 * | 12/2020 | Frommhold | .......... H04L 67/131 |
| 2005/0002662 | A1 | 1/2005 | Arpa et al. | |

(Continued)

OTHER PUBLICATIONS

Abrams et al., Computing Camera Viewpoints in an Active Robot Work Cell, Mar. 1999, p. 267-285, The International Journal of Robotics Research, vol. 18, No. 3, Sage Publications, USA.

(Continued)

*Primary Examiner* — Xiao M Wu
*Assistant Examiner* — George Renze
(74) *Attorney, Agent, or Firm* — Laurence A. Greenberg; Werner H. Stemer; Ralph E. Locher

(57) ABSTRACT

Systems and a method determine a location of a virtual camera for virtually capturing an image sequence of a virtual scene of an industrial simulation. Input data are received on the virtual scene containing a set of objects wherein at least two objects are in relative motion during a given time interval. On at least two objects of the set, the at least two focus objects are in relative motion in the given time interval and are sufficiently visible in a captured image sequence of the virtual scene in at least two time points. Inputs on data are received on a set of camera locations candidates for capturing the image sequence. For each camera location candidate, a visibility map of pixels is generated indicating the presence of the at least two focus objects and their visibility level in the corresponding capturable image sequence.

18 Claims, 5 Drawing Sheets

(56) References Cited

U.S. PATENT DOCUMENTS

| | | | |
|---|---|---|---|
| 2015/0294189 A1 | | 10/2015 | Benhimane et al. |
| 2016/0026253 A1 | | 1/2016 | Bradski et al. |
| 2018/0012411 A1 | * | 1/2018 | Richey .................. G06T 19/006 |
| 2020/0111255 A1 | * | 4/2020 | Brodsky .............. G02B 27/017 |
| 2020/0342652 A1 | * | 10/2020 | Rowell .................. G06V 10/82 |
| 2021/0082185 A1 | * | 3/2021 | Ziegler ................... G06T 15/50 |

OTHER PUBLICATIONS

Jung et al., Object Occlusion Detection Using Automatic Camera Calibration for a Wide-Area Video Surveillance System, Jun. 25, 2016, p. 1-11, Sensors, vol. 16, Article 982, Seoul, Korea.

Halper et al., CamPlan: A Camera Planning Agent, 2000, p. 1-9, AAAI Technical Report SS-00-04, 2000 AAAI Spring Symposium, AAAI Press, Palo Alto, California, USA.

* cited by examiner

METHOD AND SYSTEM FOR DETERMINING A LOCATION OF A VIRTUAL CAMERA IN INDUSTRIAL SIMULATION

FIELD AND BACKGROUND OF THE INVENTION

The present disclosure is directed, in general, to computer-aided design, visualization, and manufacturing ("CAD") systems, product lifecycle management ("PLM") systems, product data management ("PDM") systems, production environment simulation, and similar systems, that manage data for products and other items (collectively, "Product Data Management" systems or PDM systems). More specifically, the disclosure is directed to production environment simulation.

In software applications for industrial simulation, like for example Computer Aided Robotic ("CAR") tools, manufacturing process operations of production facility lines can be virtually simulated and graphically visualized in a 3D virtual environment directly within the simulation software tool.

In the field of automotive manufacturing, for example, a CAR tool usually allows to simulate the operations of a specific production line, e.g. where a given car part, like e.g. a frame, a car door or a tire, while being held by a fixture on a moving conveyor, reaches a specific robotic cell where several robots perform robotic operations on the part, like e.g. welding, coating, grasping, moving, so that the car part can exit the specific robotic cells to be brought into a subsequent robotic cell or working station.

Typically, the user of a CAR tool is able to virtually adjust, according to her/his preferences the virtual point of view of a virtual camera by inputting corresponding camera settings along the various stages of the simulated manufacturing processes, so as to virtually view and explore certain specific manufacturing operations from a desired perspective for production purposes like monitoring, controlling, validation and/or virtual commissioning.

Additionally than visualizing the virtual simulated scene within the CAR tool, the user is sometimes requested to generate a digital simulation video clip or movie, herein referred simply as "video", of the simulated production process operations along the virtual scene. The simulation video is preferably exportable in a standard video format like e.g. MP4. This generated video can then be advantageously delivered to line personnel or to other manufacturing professionals who typically have no access to the software CAR tool and are interested to visualize the production video in order to analyze the most important parts of the production phases, e.g. in order to define the major work instructions of the production process.

Such generated simulation video is required to fulfil high levels of quality in terms of the visibility of the industrial scene. In the video, the most important manufacturing operations should be properly visible in the virtual simulation of the manufacturing process.

For a CAR tool user, generating such high-quality video is a time-consuming task requiring also some cinematic knowledge skills.

For example, the user is typically required to manually define important video aspects of the production process simulation.

Examples of the relevant video aspects to be defined, include, but are not limited to: determining critical events, determining focus objects and determining a corresponding optimal camera path with dynamic viewpoints so as to properly view the motion of the focus objects along a sequence of images over time.

FIG. 2 schematically illustrates a 3D frame view of an industrial virtual scene of a simple case of robotic cell. The shown view is a frame perspective of the virtual scene 210 which can be seen as a snapshot taken from the virtual camera positioned at a certain virtual location which is not shown in the figure. As used herein the term virtual location of the camera comprises the position of the virtual camera and its orientation or viewing direction. For example, a virtual camera location comprises a camera position (X, Y, Z) of its focal point and an orientation which provides the point view or perspective from the camera focal point and can be represented via a unit direction vector ($R_X$, $R_Y$, $R_Z$).

The simulation digital video can be generated as a sequence of snapshots of image frames virtually captured by the virtual camera located at a virtual path which is a sequence of virtual locations at different time points.

In the captured image frame of FIG. 2, there is a virtual cell including industrial objects like a robot 201 with a base 202 and a gripper 203, a tire 204, a conveyor 205 and a fence 206.

In a typical industrial cell, there are specific industrial objects which are required to be visible by a viewer, for example the robot and the moving part; such objects are herein referred as focus objects. For example, in the industrial cell of FIG. 2, the focus objects are the robotic tool 203 and the part 204. During robotic operation, the focus objects 203, 204 may mutually move.

The choice of the virtual camera path to be determined has an impact on the visibility quality of the focus objects in the virtual scene viewed by the simulation user.

Additionally, the choice of the virtual camera path to be determined has an impact on the visibility quality of the focus objects in the generated simulation video.

Improved techniques for automatically determining a set of camera locations for a virtual camera path in industrial simulation are therefore desirable.

SUMMARY OF THE INVENTION

Various disclosed embodiments include methods, systems, and computer readable mediums for determining a location of a virtual camera for virtually capturing an image sequence of a virtual scene of an industrial simulation. A method includes receiving inputs on data of the virtual scene comprising a set of objects wherein at least two objects are in relative motion during a given time interval Ti. The method further includes receiving inputs on data of at least two objects of the set wherein the at least two objects are in relative motion in the given time interval Ti and are to be sufficiently visible in a captured image sequence of the virtual scene in at least two time points; said given objects being hereinafter called focus objects. The method further includes receiving inputs on data of a set of camera locations candidates for capturing the image sequence. The method further includes, for each camera location candidate, generating a map of pixels indicating the presence of the at least two focus objects and their visibility level in the corresponding capturable image sequence; said map hereinafter called visibility map. The method further includes, from the generated set of visibility maps, selecting a camera location corresponding to the visibility map for which a desired visibility level of the at least two focused objects is reached or iteratively proceeding by adjusting at least one of the camera location candidates and by iteratively executing the steps of generating the visibility maps and selecting a camera location.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms “include” and “comprise,” as well as derivatives thereof, mean inclusion without limitation; the term “or” is inclusive, meaning and/or; the phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term “controller” means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE FIGURES

For a more complete understanding of the present disclosure, and the advantages thereof, reference is now made to the following descriptions taken in conjunction with the accompanying drawings, wherein like numbers designate like objects, and in which.

DETAILED DESCRIPTION OF THE INVENTION

Figure 1:
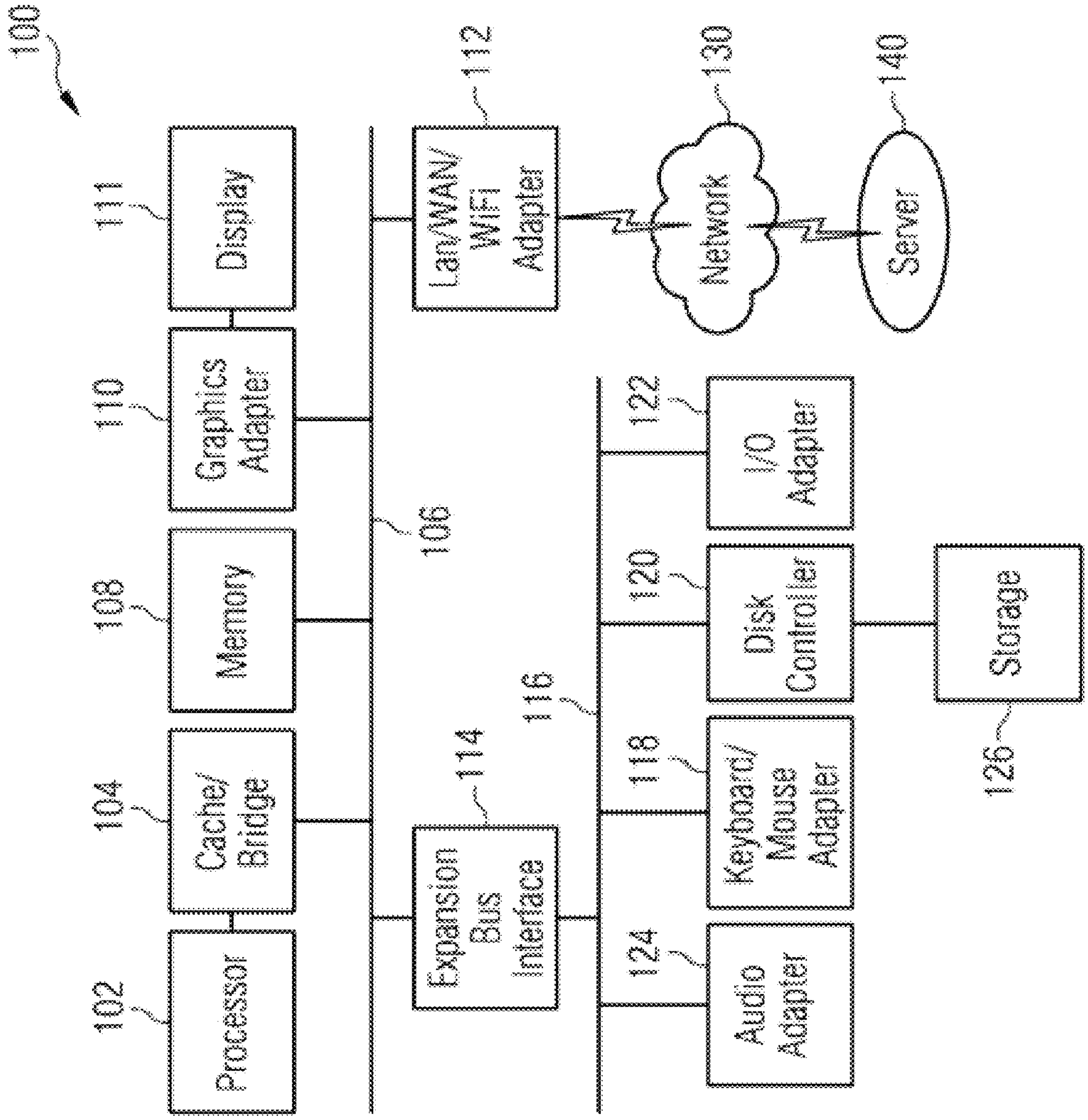
FIG. 1 illustrates a block diagram of a data processing system in which an embodiment can be implemented.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Furthermore, in the following the solution according to the embodiments is described with respect to methods and systems for determining a joint in a virtual kinematic device as well as with respect to methods and systems for providing a trained function for determining a joint in a virtual kinematic device.

Features, advantages, or alternative embodiments herein can be assigned to the other claimed objects and vice versa.

Previous techniques did not enable to automatically determine a set of camera locations for a virtual camera path for optimally visualizing a virtual industrial scene. The embodiments disclosed herein provide numerous technical benefits, including but not limited to the following examples.

With embodiments, in a video or image sequence generated from a generated camera path, the focus objects are sufficiently visible, sufficiently recognizable and sufficient apart from each other and/or are minimally obscured by other objects of the industrial scene. Previous techniques for determining virtual camera locations suffered for being fully manual, time-consuming, error-prone and/or were applied by users with no professional cinematic knowledge.

With embodiments, it is possible to automatically determine an optimal position and orientation of a virtual camera in order to view the focus objects moving in the virtual scene during a simulation and/or in order to generate a high quality movie of an industrial simulation of a production line.

In embodiments, the virtual camera location path may be determined by utilizing manufacturing process data extractable from the CAR tool to be used as additional logic for determining the focus object(s), the critical event(s), and/or initial camera location candidate(s).

With embodiments, it is determined an optimal selection of cuts and an optimal virtual camera path.

With embodiments, the time points of the video cuts may be automatically determined.

With embodiments, the determined virtual camera path enables generating a video in automated manner departing from an industrial simulation setting of a simulation software.

With embodiments, a video may be generated from an industrial simulation via an Artificial Intelligence algorithm.

Embodiments provide a fast and automated technique for generating a high quality and professional simulation video for showing the virtual production line process in industrial simulation.

Embodiments enable automatically generating an MP4 video of an industrial production process.

In embodiments, the simulation video is generated departing from an industrial simulation process of a manufacturing robotic line executable in a virtual simulation platform.

In embodiments, the generated simulation video may be particularly useful for line personnel who don’t use the virtual simulation platform who nonetheless wish to view a video of the line processes e.g. for working instructions purposes.

Embodiments enable a software application to automatically create a camera path for a specific manufacturing simulation scenario.

FIG. 1 illustrates a block diagram of a data processing system 100 in which an embodiment can be implemented, for example as a PDM system particularly configured by software or otherwise to perform the processes as described herein, and in particular as each one of a plurality of interconnected and communicating systems as described herein. The data processing system 100 illustrated can include a processor 102 connected to a level two cache/bridge 104, which is connected in turn to a local system bus 106. Local system bus 106 may be, for example, a peripheral component interconnect (PCI) architecture bus. Also connected to local system bus in the illustrated example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but are not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware illustrated in FIG. 1 may vary for particular implementations. For example, other peripheral devices, such as an optical disk drive and the like, also may be used in addition or in place of the hardware illustrated. The illustrated example is provided for the purpose of explanation only and is not meant to imply architectural limitations with respect to the present disclosure.

A data processing system in accordance with an embodiment of the present disclosure can include an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Embodiments include providing a virtual simulation platform and receiving data on an industrial virtual scene with industrial objects to be simulated.

Exemplary algorithm embodiments may include one or more of the following steps:

A) dividing a simulation timeframe into N time intervals $T_1$, Ti, $T_N$ according to one or more critical events;

B) for each given time interval Ti, determining which are the focus objects and the focus object locations at at least two time points within the time interval, e.g. $t_i$, $t_{i+1}$, beginning and end of time interval;

C) for each given interval Ti, determining the camera location Li via an optimization algorithm on a set of M computed visibility maps VMi,j where j=1, . . . , M D) using the camera path generated by the determined camera locations for generating a movie from the simulation platform.

Exemplary algorithm embodiments of item C) may include one or more of the following steps:

i) evaluating a set of M camera orientations;

ii) for each camera orientation, computing an optimal position of the camera as the optimal distance for properly fitting the focus objects into the image frame; and thereby obtaining a corresponding camera location;

iii) from the obtained camera location, generated a visibility pixel map whereby each pixel contains the information if a focus object is present at the chosen times $t_i$ and $t_{i+1}$ if there are occlusions and/or overlaps;

iv) from the set of M generated visibility maps VMi,j, choosing the visibility map VMi with the highest visibility score; e.g. via a multiple criteria decision making algorithm or via a ML trained module; determining, for the interval Ti, the camera location Li associated to the chosen visibility map VMi.

As regards the used terms "occlude" and "overlap", they can be used interchangeably because when two objects overlap one occludes the other. As used herein the term "overlap" is preferably used between focus objects and the term "occlude" is preferably used when a focus object is hidden by another object.

In embodiments, each pixel of the visibility map contains information whether any of the focus objects is present, and if yes, whether it is visible or not. For example, a focus object may not be visible due to an overlap with another focus object mutually moving or occluded by an object like e.g. a fence. Each pixel may also contain information on other objects of the virtual scene.

In embodiments, the visibility rating parameters are advantageously evaluated in the 2D space, i.e. on the visibility map and not in 3D space.

Embodiments of item i)-ii) include starting from a pool of candidates of camera orientations and move back and forth the camera until a position is found in which the focus object(s) have a certain size and fit the frame so as to have the initial virtual camera location candidate for the initial step of the algorithm.

Embodiments of item i)-ii) include other techniques for finding the initial camera location or the camera position linked to the initial M camera orientations selected in item i) for evaluation. In embodiments, a reinforcement learning algorithm may conveniently be used to speed up the optimization algorithm for finding the initial virtual camera position candidate. In embodiments, the algorithm starts with an arbitrary camera position, then it includes computing a RGB-Depth ("RGBD") image and from that image, selecting a better camera position using the rating function above as reward function; whereby the last step is preferably performed via a Reinforced Learning ("RL") network.

In embodiments, the RL network takes as input the RBGD image and computes a better camera location based on a reward function computed via an occlusion map. In embodiments, compared to the first image of the RL network, the current state is the RGBD image, the reward is the rating function, and the action is the camera motion. In embodiments, the action needs to tell from the RGBD image how to improve, the environment is the 3D scene, and the interpreter is the code to compute both the RGBD and the rating.

Figure 2:
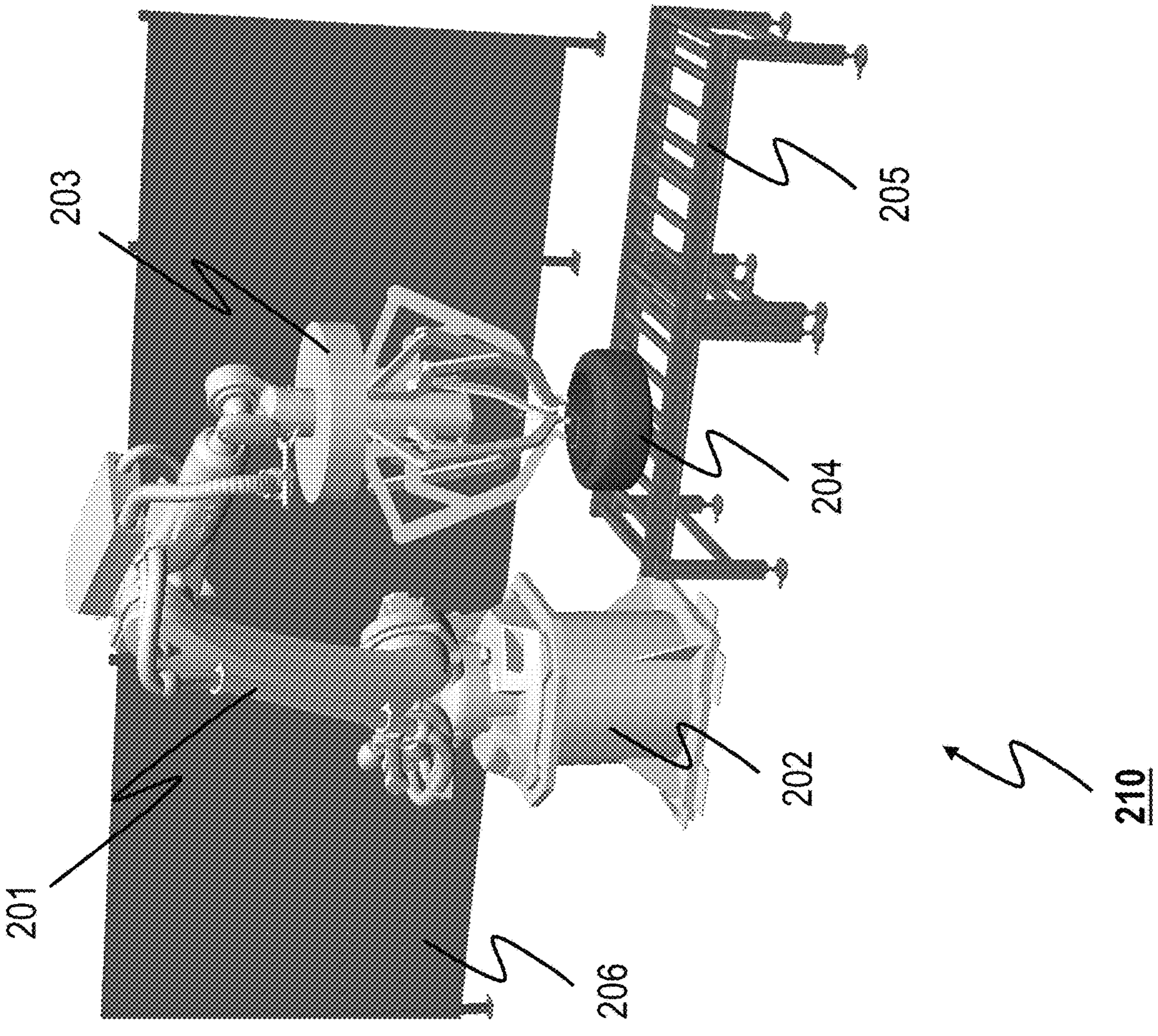
FIG. 2 schematically illustrates a 3D view of an industrial virtual cell scene (Prior Art).
Figure 3:
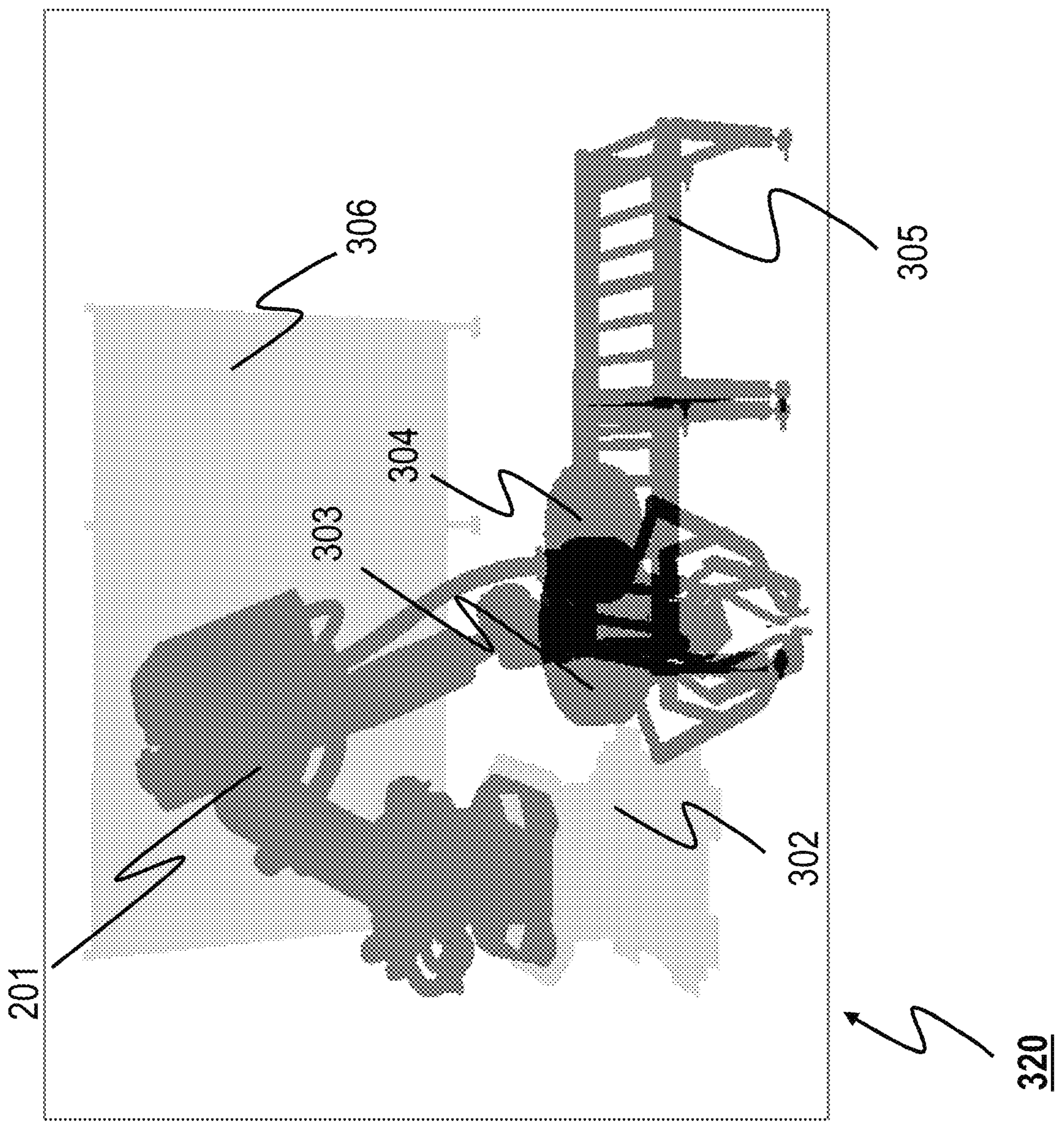
FIG. 3 schematically illustrates an exemplary visibility map of the cell shown in FIG. 2 in accordance with disclosed embodiments.

FIG. 3 schematically illustrates an exemplary visibility map of the cell shown in FIG. 2 in accordance with disclosed embodiments.

The visibility map 320 is generated from a given virtual camera location, which in this simple example has a slight different orientation that the virtual camera location of the scene captured in FIG. 2. In the generated visibility map 310 there are pixel containing information on various industrial object the robot 301 with a base 302 and a gripper 303, a tire 304, a conveyor 305 and a fence 306. In embodiments, the visibility map may preferably be generated from multiple snapshots like e.g. a dozen of images.

Assume that in the virtual cell scene 210 there are three focus objects, the robot 201 with the gripper 203, the part 204 and the conveyor 205 and one industrial object which is not a focus object, the fence 206 and robot's base 202.

It is noted that the exemplary visibility map 320 shown in FIG. 3 contains pixels in greyscale format for illustration purposes. In embodiments, the visibility map can be in a color format. For example, the medium grey pixels refer to focus objects 301, 303, 304, 305 and may be green pixels; the light grey pixel refer to other industrial objects which are not focus objects and could be yellow pixels; and, the dark grey pixels 330 denote focus object(s) which are present but not visible and may be red pixels.

In embodiments, the dark grey pixels may indicate occlusion of a focus object.

In embodiments, the visibility map may be a color-coded image where each color is an identifier providing predefined information about the presence of an industrial objects, of focus objects and their visibility level.

In other embodiments, the visibility map may be a table where each cell or pixel can contain text or numerical information for assessing the visibility of focus objects.

In embodiments, the visibility map provides data to compute in which percentage amount a focus object is visible and not occluded and/or not overlapped during the time interval Ti. In embodiments, a rating function can be computed assessing whether all focus object(s) are sufficiently visible in the scene by determining a minimum visibility threshold, e.g. for example 50-70% of the focus object. In embodiments, by computing rating functions on the visibility of the focus objects, the camera locations parameters can be optimized to obtain the highest score.

In embodiments, each visibility map is associated to a visibility score and consequently each corresponding virtual camera location is rated with a corresponding visibility score.

In embodiments, the visibility map may be generated on more than two time points on the time interval Ti. In embodiments, the visibility map is generated from at least two scene shots, i.e. at least two images captured from the scene at a different time interval.

In embodiments, the pixel granularity can be changed in order to reduce computational efforts.

Exemplary algorithm embodiments of item iv) may include one or more of the following steps: from each generated visibility map VMi,j, computing a set of rating criteria based on visibility rating parameters; determining the camera location Li by choosing the visibility map VMi with the highest visibility score via a multiple criteria decision making ("MCDM") algorithm, e.g. a weighted sum method. In embodiments, other algorithms than MCDM algorithms may be used for evaluating the set of criteria for determining the camera path.

Example of visibility rating parameters include, but are not limited by, the amount of occlusions of the focus object(s); the separations between focus objects in the 2D; the size of the focus objects on the screen; and/or; the direction of motion in 2D of the focus objects during the simulation.

In embodiments, the above mentioned list of rating criteria parameters may reflect a priority order.

Exemplary algorithm embodiments of item iv) may include the following steps: from each generated visibility map VMi,j, choosing the best visibility map VMi via a module trained with a Machine Learning ("ML") algorithm; determining the camera location Li by choosing from the chosen visibility map VMi with the highest visibility score. In embodiments, the ML-trained module is previously trained via a supervised ML algorithm with visibility maps that have been manually labeled according to their visibility quality level.

Embodiments of item A) include defining a critical event as an event critical for the specific manufacturing process. For example, in the automotive industry, a critical event may be the time point the car part is entering a particular robotic cell; the time point the car part is exiting the robotic cell; the time point a robotic operation begins or ends etc. In embodiments, the critical events may be extracted from the simulation data of the given simulation.

Exemplary embodiments for determining the focus objects of item B) include, but are not limited by, determining the objects that are active during a defined time interval; or determining industrial objects of particular industrial interest in the simulation like a part, a robot, a robotic tool, a moving conveyor etc. In embodiments, the focus objects may be determined from simulation data extracted from the given simulation. For example, in embodiments, focus objects may be determined by evaluating the simulation, finding a part or a moving object as defined in the object file. In embodiments, there may be predefined rules for automatically determining a part and a focus object, primary or secondary rules which can be automatically extracted from accessible simulation data. In embodiments, the focus objects may be determined via user inputs, for example via a User Interface. In embodiments, a set of focus objects may be a bundle of parts.

In embodiments, some of the time intervals Ti, the camera location Li may preferably be non-static but it may rather dynamically follow the motion of one or more focus objects. Thus, in embodiments, under certain conditions, the camera is moved according to predetermined rules during the interval. In embodiments, a decision whether a camera location Li is static or dynamic may preferably be determined in accordance with the amount of motion of the set of focus objects, e.g. like for example the above mentioned rating criteria parameter 2D motion direction of the focus object.

Example of a condition for having a camera moving in the time interval includes, but is not limited by, if a focus objects is moving by a large distance within the interval, the camera may then be moved to follow the focus object with the same speed as the focus object's speed; thus, the motion distance might be one criteria. In embodiments, the rating of the images during the motion may be checked and compared with a static camera to determine whether a moving camera improves the visibility results. In embodiments, one may fix the camera position but change its direction in order to have it always pointing towards a focus object.

Embodiments may include one or more of the following steps:

- receiving as input data a scene with a simulation;
- splitting the simulation time into N time intervals Ti;
- for each time interval Ti, determining the set of focus objects;
- computing a number of M camera locations candidates whose captured image sequence show all the focus objects of the set;
- for each location candidate, computing visibility quality rating via a visibility map;
- selecting the best camera location with the best rating;
- create a camera path from the selected camera locations.

In embodiments, the camera location is selected based on the highest quality visibility map. In embodiments, only one focus object may be moving for example a tire is moving on an assembly line.

With the terms 'simulation scene data' it is broadly meant data on a set of 3D objects that are placed at certain locations in the 3D scene, often including some defined relationships between them. In addition, such 'simulation data' may contain the information about the positions of these objects over time so that the simulation system is able to compute the positions of all objects at every time point.

Figure 4:
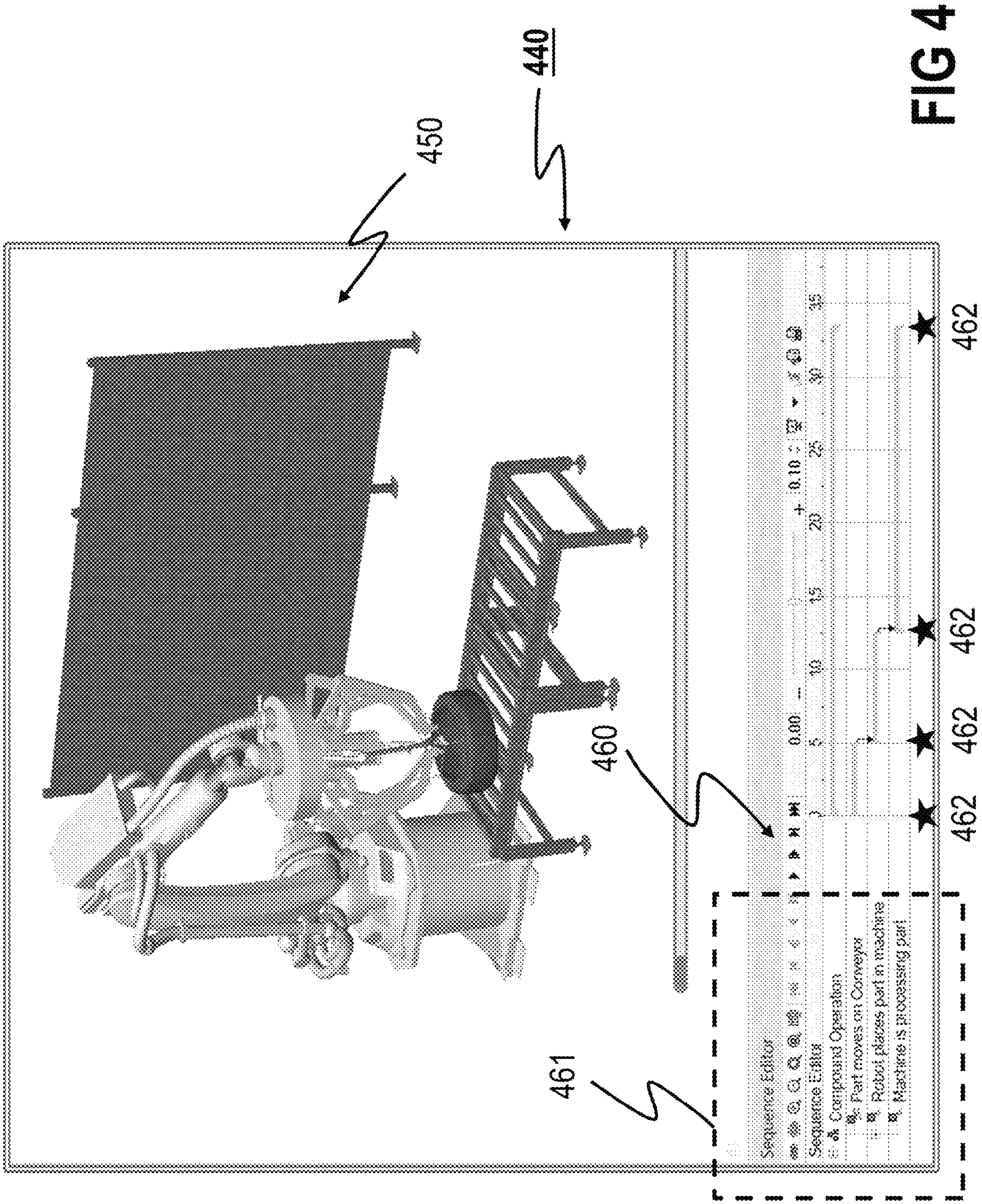
FIG. 4 schematically illustrates a screen of a simulation platform with a virtual scene viewer and a process sequence viewer in accordance with embodiments.

FIG. 4 schematically illustrates a screen of a simulation platform with a virtual scene viewer and a process sequence viewer in accordance with embodiments.

In FIG. 4, it is shown the GUI screen 440 of a CAR tool—e.g. Process Simulate—with an upper part 450 and a lower part 460. In the upper part 450, it is shown a virtual scene viewer 450 with a 3D view of the robotic cell. In the lower part 460, it is shown a process sequence with operation flows. In general, a sequence editor is a user editor comprising information data about the manufacturing process flow over time e.g. the part entering the cell, a fixture clamping the part, details on the robotic welding operations, the part exiting the cell via the conveyor rails etc., which operations are done in sequence and which in parallel. For the simplified example of FIG. 4 in the sequence editor 460 shows three sequential operations described with textual information data on the left part 461, regarding a "compound operation" comprising sub operations of "part moves on conveyor", robots places part in machine", "machine is processing part". Four stars 462 indicates four possible time points associable to critical events for determining virtual camera locations and/or video cuts. In embodiments, the four possible critical times 462 may be associated to events requiring a virtual camera location change.

In embodiments, the simulation process data similar to the one shown in the sequence editor can be automatically extracted from manufacturing process data of the CAR tool and used as additional logic for determining the focus object(s), the critical event(s), possible initial camera location candidates and other relevant status and condition data for determining the visibility rating parameters.

In embodiments, during the training phase with training data for generating the ML trained selector module of the visibility map, the trained function can adapt to new circumstances and can detect and extrapolate patterns.

In general, parameters of a trained function can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained functions can be adapted iteratively by several steps of training.

In particular, a trained function can comprise a neural network, a support vector machine, a decision tree and/or a Bayesian network, and/or the trained function can be based on k-means clustering, Qlearning, genetic algorithms and/or association rules.

In particular, a neural network can be a deep neural network, a convolutional neural network, or a convolutional deep neural network. Furthermore, a neural network can be an adversarial network, a deep adversarial network and/or a generative adversarial network.

In embodiments, the ML algorithm is a supervised model, for example a binary classifier which is classifying between true and pseudo error. In embodiments, other classifiers may be used for example logistic regressor, random forest classifier, xgboost classifier etc. In embodiments, a feed forward neural network via TensorFlow framework may be used.

Figure 5:
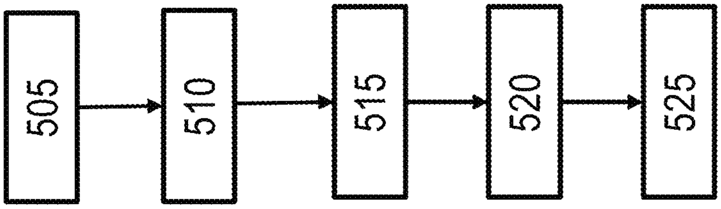
FIG. 5 illustrates a flowchart for determining a location of a virtual camera in industrial simulation in accordance with disclosed embodiments.

FIG. 5 illustrates a flowchart of a method for determining a location of a virtual camera for virtually capturing an image sequence of a virtual scene of an industrial simulation in accordance with disclosed embodiments. Such method can be performed, for example, by system 100 of FIG. 1 described above, but the "system" in the process below can be any apparatus configured to perform a process as described.

At act 505, inputs are received on data of the virtual scene comprising a set of objects wherein at least two objects are in relative motion during a given time interval Ti At act 510, inputs are received on data of at least two objects of the set wherein the at least two objects are to be sufficiently visible in a captured image sequence of the virtual scene in at least two time points; said given objects being hereinafter called "focus objects".

At act 515, inputs are received on data on a set of camera locations candidates for capturing the image sequence.

At act 520, for each camera location candidate, a map of pixels is generated indicating the presence of the at least two focus objects and their visibility level in the corresponding capturable image sequence; said map hereinafter called "visibility map".

At act 525 from the generated set of visibility maps, a camera location is selected corresponding to the visibility map for which a desired visibility level of the at least two focused objects is reached or iteratively proceeding by adjusting at least one of the camera location candidate and by iteratively executing acts 520 and 525.

In embodiments, the visibility map is generated by superimposing at least two images captured at at least two time points in the given time interval Ti and by indicating in each map pixel if a portion of a focus object is present and, if yes, if the present focus object portion is occluded.

In embodiments, the visibility level of a visibility map is computable via a set of visibility rating parameters computable from the map; the parameters are selected from the group consisting of: parameters for rating an occlusion amount of the at least two focus objects; parameters for rating a distance between at least two of the focus objects; parameters for rating a relative size of the at least two focus objects; and, parameters for rating 2D motion direction of the at least two focus objects.

In embodiments, the visibility map is selected via a MCDM algorithm on a set of visibility rating parameters computed for the set of visibility maps.

In embodiments, the visibility map is selected by applying a selector module previously trained with a ML algorithm.

In embodiments, any of the inputs received at acts 505, 510 and/or 515 may be automatically determined; it may be manually inputted by a user; it may be automatically extracted from manufacturing process data of the industrial simulation; and/or, it may be a combination of the above.

In embodiments, based on the generated camera path, an edited video of the simulated scene is provided.

In embodiments, the input scenarios like a scene with different occlusion patterns and different focus object(s) has an impact on the generated camera path.

Embodiments further including the step of controlling at least one manufacturing operation in accordance with the simulated scene as shown in the images captured by the virtual camera moving along the determined virtual camera path.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system 100 may conform to any of the various current implementations and practices known in the art.

It is important to note that while the disclosure includes a description in the context of a fully functional system, those skilled in the art will appreciate that at least portions of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims.

What is claimed is:

1. A method for determining, by a data processing system, a location of a virtual camera for virtually capturing an image sequence of a virtual scene of an industrial simulation, the method comprises the steps of:

a) receiving inputs on data of the virtual scene containing a set of objects wherein at least two of the objects are in relative motion during a given time interval Ti;

b) receiving inputs on data of at least two of the objects of the set of objects, wherein the at least two objects are in relative motion in the given time interval Ti and are to be visible in a captured image sequence of the virtual scene in at least two time points, wherein the objects being hereinafter called focus objects;

c) receiving inputs on data of a set of camera locations candidates for capturing the image sequence;

d) for each camera location candidate, generating a map of pixels indicating a presence of the at least two focus objects and their visibility level in a corresponding capturable image sequence, the map hereinafter being called a visibility map; and e) from a generated set of visibility maps, selecting a camera location corresponding to the visibility map for which a desired visibility level of the at least two focused objects is reached or iteratively proceeding by adjusting at least one of the camera location candidates and by iteratively executing steps d)-e).

2. The method according to claim 1, wherein the visibility map is generated by superimposing at least two images captured at at least two time points in the given time interval Ti and by indicating in each map pixel if a portion of a focus object is present and, if yes, if a present focus object portion is occluded.

3. The method according to claim 1, wherein the visibility level of the visibility map is computable via a set of visibility rating parameters computable from the visibility map; the visibility rating parameters are selected from the group consisting of:

parameters for rating an occlusion amount of the at least two focus objects;

parameters for rating a distance between at least two of the focus objects;

parameters for rating a relative size of the at least two focus objects; and parameters for rating 2D motion direction of the at least two focus objects.

4. The method according to claim 3, wherein the visibility map is selected via a multiple criteria decision making algorithm on the set of visibility rating parameters computed for the set of visibility maps.

5. The method according to claim 1, wherein the visibility map is selected by applying a selector module previously trained with a machine learning algorithm.

6. The method according to claim 1, wherein any of the inputs received at item a), b), or c) is:

automatically determined;

manually inputted by a user;

automatically extracted from manufacturing process data of the industrial simulation; and a combination of above.

7. A data processing system, comprising:

a processor; and an accessible memory, the data processing system configured to:

a) receive inputs on data of a virtual scene containing a set of objects, wherein at least two of the objects are in relative motion during a given time interval Ti;

b) receive inputs on data of at least two of the objects of the set of objects, wherein the at least two objects are in relative motion in the given time interval Ti and are visible in a captured image sequence of a virtual scene in at least two time points; said objects being hereinafter called focus objects;

c) receive inputs on data of a set of camera locations candidates for capturing an image sequence;

d) for each camera location candidate, generate a map of pixels indicating a presence of the at least two focus objects and their visibility level in a corresponding capturable image sequence; said map hereinafter called a visibility map;

e) from a generated set of visibility maps, select a camera location corresponding to the visibility map for which a desired visibility level of the at least two focused objects is reached or iteratively proceeding by adjusting at least one of the camera location candidate and by iteratively executing steps d)-e).

8. The data processing system according to claim 7, wherein the visibility map is generated by superimposing at least two images captured at at least two time points in the given time interval Ti and by indicating in each map pixel if a portion of a focus object is present and, if yes, if a present focus object portion is occluded.

9. The data processing system according to claim 7, wherein the visibility level of the visibility map is computable via a set of visibility rating parameters computable from said map, said visibility rating parameters are selected from the group consisting of:

parameters for rating an occlusion amount of the at least two focus objects;

parameters for rating a distance between at least two of the focus objects;

parameters for rating a relative size of the at least two focus objects; and parameters for rating 2D motion direction of the at least two focus objects.

10. The data processing system according to claim 9, wherein the visibility map is selected via a multiple criteria decision making algorithm on a set of visibility rating parameters computed for the set of visibility maps.

11. The data processing system according to claim 7, wherein the visibility map is selected by applying a selector module previously trained with a machine learning algorithm.

12. The data processing system according to claim 7, wherein any of the inputs received at item a), b), or c) is:

automatically determined;

manually inputted by a user;

automatically extracted from manufacturing process data of an industrial simulation; and a combination of above.

13. A non-transitory computer-readable medium comprising executable instructions that, when executed, cause at least one data processing system to:

a) receive inputs on data of a virtual scene having a set of objects, wherein at least two of the objects are in relative motion during a given time interval Ti;

b) receive inputs on data of at least two of the objects of the set of objects, wherein the at least two objects are in relative motion in the given time interval Ti and are to be visible in a captured image sequence of the virtual scene in at least two time points, said objects being hereinafter called focus objects;

c) receive inputs on data of a set of camera locations candidates for capturing an image sequence;

d) for each camera location candidate, generate a map of pixels indicating a presence of the at least two focus objects and their visibility level in a corresponding capturable image sequence; the map hereinafter called a visibility map;

e) from a generated set of visibility maps, select a camera location corresponding to the visibility map for which a desired visibility level of the at least two focused objects is reached or iteratively proceeding by adjusting at least one of the camera location candidate and by iteratively executing steps d)-e).

14. The non-transitory computer-readable medium according to claim 13, wherein the visibility map is generated by superimposing at least two images captured at at least two time points in the given time interval Ti and by indicating in each map pixel if a portion of a focus object is present and, if yes, if a present focus object portion is occluded.

15. The non-transitory computer-readable medium according to claim 13, wherein the desired visibility level of the visibility map is computable via a set of visibility rating parameters computable from said map, said visibility rating parameters are selected from the group consisting of:

parameters for rating an occlusion amount of the at least two focus objects;

parameters for rating a distance between at least two of the focus objects;

parameters for rating a relative size of the at least two focus objects; and parameters for rating 2D motion direction of the at least two focus objects.

16. The non-transitory computer-readable medium according to claim 15, wherein the visibility map is selected via a multiple criteria decision making algorithm on the set of visibility rating parameters computed for the set of visibility maps.

17. The non-transitory computer-readable medium according to claim 13, wherein the visibility map is selected by applying a selector module previously trained with a machine learning algorithm.

18. The non-transitory computer-readable medium according to claim 13, wherein any of the inputs received at item a), b), or c) is:

automatically determined;

manually inputted by a user;

automatically extracted from manufacturing process data of an industrial simulation; and a combination of the above.

* * * * *